United States Patent
Harrop

(10) Patent No.: US 7,225,250 B1
(45) Date of Patent: May 29, 2007

(54) METHOD AND SYSTEM FOR PREDICTIVE ENTERPRISE RESOURCE MANAGEMENT

(75) Inventor: Thomas C. Harrop, Folsom, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 613 days.

(21) Appl. No.: 09/702,160

(22) Filed: Oct. 30, 2000

(51) Int. Cl.
*G06F 15/173* (2006.01)

(52) U.S. Cl. ................................ 709/224; 709/223

(58) Field of Classification Search ........ 709/222–224, 709/226; 714/46–57, 4, 5, 25, 26; 702/182, 702/186, 188; 703/4, 13; 370/224, 241
See application file for complete search history.

(56) References Cited

U.S. PATENT DOCUMENTS

| | | | |
|---|---|---|---|
| 5,123,017 A * | 6/1992 | Simpkins et al. ............. 714/26 |
| 5,615,323 A | 3/1997 | Engel et al. |
| 5,819,028 A * | 10/1998 | Manghirmalani et al. ...... 714/57 |
| 5,961,598 A * | 10/1999 | Sime .......................... 709/224 |
| 6,047,279 A * | 4/2000 | Barrack et al. ............... 706/60 |
| 6,058,260 A * | 5/2000 | Brockel et al. ................. 703/4 |
| 6,327,677 B1 * | 12/2001 | Garg et al. .................... 714/37 |
| 6,353,902 B1 * | 3/2002 | Kulatunge et al. .......... 714/712 |
| 6,415,189 B1 * | 7/2002 | Hajji ............................. 700/79 |
| 6,446,123 B1 * | 9/2002 | Ballantine et al. .......... 709/224 |
| 6,456,306 B1 * | 9/2002 | Chin et al. ................... 345/810 |
| 6,691,067 B1 * | 2/2004 | Ding et al. .................. 709/224 |
| 6,738,811 B1 * | 5/2004 | Liang .......................... 709/224 |
| 6,765,864 B1 * | 7/2004 | Natarajan et al. ........... 370/224 |
| 6,892,317 B1 * | 5/2005 | Sampath et al. ................ 714/4 |
| 2002/0038292 A1 * | 3/2002 | Quelene ....................... 705/80 |
| 2002/0133757 A1 * | 9/2002 | Bertram et al. ............... 714/47 |
| 2003/0088663 A1 * | 5/2003 | Battat et al. ................ 709/224 |

OTHER PUBLICATIONS

U.S. Appl. No. 09/345,634, filed Jun. 30, 1999, Tentij et al.
U.S. Appl. No. 09/469,026, filed Dec. 21, 1999, Clark et al.

* cited by examiner

*Primary Examiner*—David Wiley
*Assistant Examiner*—David England

(57) ABSTRACT

A system and method are disclosed which predict whether a performance problem within a network is likely to be encountered during future operation. Furthermore, a preferred embodiment not only predicts the likelihood of a performance problem, but further determines the appropriate preventative measures to be taken in an attempt to prevent a predicted performance problem from occurring. In a preferred embodiment, a management system (MS) that oversees the operation of a network is implemented to predict likely performance problems within the network, and may determine appropriate preventative measures for preventing predicted performance problems within the network. Polling gateway(s) may be utilized to periodically poll the network resources in order to retrieve status information for such resources, including but not limited to status of disk(s), database(s), memory, CPU(s), and operating system(s) within the network. The gathered status information is then evaluated by the MS by, for example, correlating such status information with known performance rules for the network to predict potential performance problems, and based on such evaluation, the MS may predict whether a future performance problem is likely to be encountered. Once a future performance problem has been predicted, the MS determines an appropriate preventive action for preventing the performance problem from occurring, and the MS may initiate the appropriate preventive action before the occurrence of the predicted performance problem in an attempt to prevent such performance problem. Most preferably, the network management system is implemented to "learn" symptoms of performance problems over time.

45 Claims, 8 Drawing Sheets

```
Name: Resource
Type: Class
Attribute(s): Type
StartMon       (String)
LastMon        (String)
MinFaults      (Real)
IntFaults      (Real)
MajFaults      (Real)
```

FIG. 9

```
Name: ResourceMgr
Class Resource
Type: Managed Object Manager
```

FIG. 10

```
Name: SYSR
Type: Resource
Managed By: ResourceMgr
Attribute(s): Type
StartMon          (String)
LastMon           (String)
MinFaults         (Real)
IntFaults         (Real)
MajFaults         (Real)
Runqi             (Real)
Runqb             (Real)
Runqw             (Real)
Contxt            (Real)
MPin              (Real)
MPout             (Real)
MemRe             (Real)
Swapa             (Real)
CPU_Failure_Est   (Real)
Mem_Failure_Est   (Real)
Sys_Failure_Est   (Real)
```

FIG. 11

```
Name: SYSD
Type: Resource
Managed By: ResourceMgr
Attribute(s): Type
StartMon            (String)
LastMon             (String)
MinFaults           (Real)
IntFaults           (Real)
MajFaults           (Real)
DiskW               (Real)
Disk_Failure_Est    (Real)
```

FIG. 12

```
Name: NETR
Type: Resource
Managed By: ResourceMgr
Attribute(s): Type
StartMon            (String)
LastMon             (String)
MinorFaults         (Real)
IntermediateFaults  (Real)
MajorFaults         (Real)
IP                  (Integer32)
OP                  (Integer32)
IE                  (Integer32)
OE                  (Integer32)
Coll                (Integer32)
Defer               (Integer32)
IPID                (Integer32)
IPOD                (Integer32)
```

FIG. 13

METHOD AND SYSTEM FOR PREDICTIVE ENTERPRISE RESOURCE MANAGEMENT

RELATED APPLICATIONS

This application is related to co-pending application entitled "SYSTEM AND METHOD FOR A COMMON OBJECT CLASS LIBRARY," assigned Ser. No. 09/469,026, filed Dec. 21, 1999; co-pending application entitled "FAULT MANAGEMENT SYSTEM AND METHOD," assigned Ser. No. 09/345,634, filed Jun. 30, 1999; all of which are assigned to a common assignee, the disclosures of which are hereby incorporated herein by reference.

TECHNICAL FIELD

This application relates in general to prediction of performance problems within a network and preventative maintenance to avoid such predicted problems, and more specifically to a system and method in which a network management system gathers information about a network, analyzes the information based on rule sets for the network to predict future performance problems, and intelligently determines appropriate actions to take in an attempt to prevent such performance problems from occurring.

BACKGROUND

The information-communication industry is an essential element of today's society, which is relied upon heavily by most companies, businesses, agencies, educational institutions, and other entities, as well as individuals. As a result, information service providers such as telephone, cable, and wireless carriers, Internet Service Providers (ISPs) and utility companies all have the need to deploy effective systems suitable for servicing such a demand. The importance of such information service providers rapidly deploying new systems and system elements and altering their existing management systems to accommodate evolving business and network requirements as needed has been recognized in the prior art. For example, it has been recognized that information service providers should have the ability to integrate existing network equipment and systems with new elements and applications, customize existing systems and applications, and scale systems to accommodate growing networks and traffic volumes.

Network management and operations have become crucial to the competitiveness of communication companies, utilities, banks and other companies operating Wide Area Networks (WANs) of computer devices and/or other network types and devices, including SONET, Wireline, Mobile, etcetera. For instance, many companies currently use customized "legacy" network management systems (NMSs) and operations support systems (OSSs). However, such NMSs/OSSs are generally based on older technologies, which poorly integrate disparate network elements and associated Element Management Systems (EMSs). Many other companies use other types of EMSs, NMSs and OSSs that are not scalable, cannot be easily interfaced with disparate network elements, and require costly programming while offering limited features and flexibility.

Objective Systems Integrators, Inc. ("OSI") of Folsom, Calif., the assignee of the present invention, currently produces a Framework virtual system management (VSM) which is both operationally and network-focused, and is primarily used in the development of EMSs and NMSs sold under the trademark NetExpert™. In general, NetExpert™ may allow for relatively easy and inexpensive integration of disparate network elements and associated EMSs within a network. NetExpert™ is an object-oriented network management system that is comprised of a set of integrated software modules and graphical user interface (GUI) development tools that permit the creation and deployment of network management and operations support solutions. Each element type, device, device component, and even database may be managed as a separate "object." NetExpert, like other NMSs/OSSs on the market today, may require customization for each managed object.

Each element type and device, as well as other managed objects, requires a separate set of rules (known as rule sets) to be tailored to the nature of the object. An object may comprise specific hardware and software, and also may include the business practices of the company. Each rule set provides the details for the management of the particular object to which the rules are directed. NetExpert's Fourth Generation Language (4GL) editors permit this customization to be performed by subject matter experts (SMEs). SMEs use their knowledge to create simple rule sets, such as "if-then" statements, to manage their Network Elements, EMSs, or NMSs, rather than requiring skilled programmers to integrate devices and other elements with additional computer software code such as C and/or C++.

EMSs/NMSs can manage a wide range of communications and computer devices, including switches, DCS, SONET ADM's, routers, testing devices, video units, banking ATM machines, air traffic control systems, and other computer elements such as databases and objects. OSSs provide a broader layer of functionality to directly support the daily operation of the network, such as order negotiation, order processing, line assignment, line testing and billing. EMSs/NMSs can be a component of a larger OSS system. For the sake of simplicity, but not limitation, the communication switching network context will be used throughout this application.

Each device, such as a switch, for example, either responds to or has available certain information relating to its operation, such as performance, fault, configuration, and inventory. For each device, the correlation of performance information with operational functions is typically provided within the EMS/NMS/OSS. For example, when an equipment provider develops and markets a new switch, a skilled programmer typically identifies and analyzes the performance information for that switch and then correlates that information with all of the functionalities that a customer may desire to use in connection with that switch. The programmer typically then modifies the existing EMS/NMS/OSS program code to manage that switch. Additionally, as disclosed in commonly assigned U.S. Pat. No. 6,047,279 entitled "SYSTEM AND METHOD FOR AUTOMATIC NETWORK MANAGEMENT SUPPORT USING ARTIFICIAL INTELLIGENCE," the disclosure of which is hereby incorporated by reference herein, an EMS/NMS/OSS may use artificial intelligence (e.g., expert systems and learning techniques) to automatically identify and integrate new network elements.

NetExpert™, OSI's network management and operations support framework, currently uses a high-level computer language to permit non-programmers to write rule sets to manage or route information within NetExpert, between NetExpert systems, or between NetExpert and other programs and functions, without the cost and complexity of other EMSs/NMSs/OSSs. For example, if a particular fault message is generated by the switch, one customer may want to page a particular technician, while a second customer may only want to have an indicator light activated or a warning message generated. Generally, these rules are entered through an editor, such as NetExpert's 4GL editor.

In providing and operating a network, monitoring and control functionality is clearly important to support various management aspects of the network. In more recent times, not only does the network itself have to be managed, but the services provided by the network also have to be managed. Generally, a network management system has to have interfaces with the network it is managing so that it can monitor or test various aspects of the network, such as the current configuration and traffic conditions, and also determine whether the network is performing satisfactorily, i.e., meeting any performance criteria applicable.

Given the importance of network systems, it is crucial that information service providers maintain the operability, integrity, performance level, and overall "health" of the network. For example, a service level contract between a service provider and a customer often requires that the service provider provide a particular quality of service to the customer. The term network "performance" may be utilized herein for conciseness, which is intended to broadly encompass the network's operability, integrity, and various other conditions of the network and/or its elements affecting the overall "health" of the network. As an example, a service provider may utilize a computer network, such as Ethernet, Token Ring, fiber distributed data interface, virtual circuit switched network, e.g., frame relay (FR) or asynchronous transfer mode (ATM) network, which may each include one or more computer systems and/or other types of "network elements." Additionally, one or more of such types of computer networks may be interlinked to form a larger overall network of elements. As the network is in use for a period of time (e.g., days or even years), characteristics of the network typically change from time to time during such usage. For instance, as the network is in use over time, various system resources begin being consumed. Furthermore, various peculiarities (e.g., faults) in the system may be detected. For example, a network management system (NMS) may detect that resources within the network are being consumed in an inappropriate manner. For instance, system resources such as the system's CPU, memory, and hard drive, as examples, may be consumed (or utilized) beyond an acceptable usage level. Various other undesirable characteristics of a system may be detected upon their occurrence. For example, failure of all or a portion of a network or an element of the network may be detected upon such failure.

Generally, problems in computer networks of the prior art are detected once they occur, and only then is an attempt made to correct or otherwise respond to such problems. NMSs of the prior art typically do not attempt to predict whether the network itself or some element of the network is likely to fail or whether performance of the network or some element thereof is likely to be hindered (e.g., slow to an undesirable performance level) while the network is in use. That is, prior art EMSs/NMSs/OSSs typically fail to recognize conditions that indicate that a failure or otherwise poor performance of the network or an element of the network is likely to occur in the near future. Furthermore, such EMSs/NMSs/OSSs not only fail to predict a likely failure or poor performance, but also fail to take responsive actions to prevent such a problem. While prior art EMSs/NMSs/OSSs may provide warnings of an inappropriate or dangerous condition in the network (e.g., fault messages), EMSs/NMSs/OSSs of the prior art fail to detect a cause of such a problem or predict a solution to deter such a problem.

Furthermore, before such an inappropriate or dangerous condition occurs within a network (or element thereof), EMSs/NMSs/OSSs of the prior art fail to predict, based on evaluation of the network (or element thereof), that such an inappropriate or dangerous condition is likely to occur in the future. Accordingly, prior art EMSs/NMSs/OSSs fail to predict or recognize potential problems within the network, and further fail to take preventative action in an attempt to prevent such a problem from occurring. That is, prior art EMSs/NMSs/OSSs fail to recognize potential problems within a network and take appropriate preventative action(s) in an attempt to avoid such problems.

Typically, once a warning, such as a fault message, is provided in prior art systems, the performance of the network is already negatively affected. That is, in prior art EMSs/NMSs/OSSs, a fault message is typically provided only after a problem has occurred. Generally, in prior art networks, once a problem, such as a failure or other type of inappropriate condition is detected in the network, reliance is placed on an engineer or technician to inspect and service the network. Such a technician can perform some limited analysis of the network in an attempt to detect the source of the problem, but the technician will not necessarily find the source of a problem. In fact, when the technician actually services the network, conditions in the network may have changed such that the technician fails to detect that a problem even exists within the network. Accordingly, difficulty exists in prior art networks in determining whether the network (or some element thereof) is likely to fail during future use of the network and to prevent such a failure. Therefore, prior art EMSs/NMSs/OSSs exist which can monitor a network to know when the network (or some element thereof) fails, but such EMSs/Ss/OSSs fail to provide a prediction of when the network (or some element thereof) is about to fail because, for example, certain resources being utilized at an inappropriate rate or some other factors being detected which are indicative of a problem existing.

Prior art networks may include one or more "intelligent agents" that monitor a specific network element to predict failures within the specific network element and may possibly trigger some type of manual intervention in an attempt to prevent such a failure of the specific network element. However, networks of the prior art have generally not been implemented to monitor the system which manages the network elements (i.e., the EMS/NMS/OSS) to predict performance problems within the network. Generally, such intelligent agents that have been implemented in the prior art to monitor a specific network element are "passive." That is, while such agents may detect failures for a specific network element, they typically rely on some type of manual intervention to resolve a detected failure.

Additionally, such intelligent agents provide very limited, focused monitoring, in that they are typically implemented to monitor only a specific network element. Thus, overall problems of a network may not be detected or prevented by such intelligent agents. That is, network problems of an entire network, which may or may not involve a specific network element being monitored by an intelligent agent, are generally not predicted or prevented by such intelligent agents. Furthermore, such intelligent agents that monitor a specific network element may have a skewed view of whether a problem exists. For instance, an intelligent agent may determine that a condition exists that is very critical to the performance of its specific network element, but such a condition may have little or no effect on the overall performance of other network elements or the network as a whole.

The intelligent agent is typically unable to determine the effect a condition detected within its associated network element may or may not have on other elements or the network as a whole. On the other hand, an intelligent agent may determine that a condition exists for its monitored network element that is not very critical for the performance of such network element, but the condition may greatly impact the performance of other network elements and/or the network as a whole. Again, the intelligent agent is typically unable to determine the effect a condition detected for its associated network element may or may not have on other elements or the network as a whole.

SUMMARY OF THE INVENTION

The present invention is directed to a method and system that address the problems of preventative maintenance associated with dissimilar events that are likely to result in a performance problem (e.g., a failure) of a computer network.

The present invention is directed to a system and method which predict whether a performance problem within a network is likely to be encountered during future operation. Furthermore, a preferred embodiment not only predicts the likelihood of a performance problem, but further determines the appropriate preventative measures to be taken in an attempt to prevent a predicted performance problem from occurring. In a preferred embodiment, a network management system that oversees the operation of a network is implemented to predict likely performance problems within the network, and may determine appropriate preventative measures for preventing predicted performance problems within the network.

More specifically, a preferred embodiment provides a system and method for managing a network, which gathers status information about the network resources. For example, a most preferred embodiment utilizes a polling gateway to periodically poll the network resources in order to retrieve status information for such resources. Most preferably, a plurality of polling gateways may be distributed throughout the network, and various types of polling gateways may be implemented having responsibility of polling particular types of network elements. Status information may be retrieved for various network resources, including but not limited to status of disk(s), database(s), memory, CPU(s), and operating system(s) within the network. A most preferred embodiment then evaluates the gathered status information. For example, a network management system may receive the gathered status information from the polling gateway and operates to correlate the gathered status information with known performance rules for the network to predict potential performance problems. Most preferably, a centralized network management system receives the status information gathered by the various distributed polling gateways and correlates such gathered status information to evaluate the overall performance of the network. For instance, the gathered status information may be evaluated in view of known performance rules for the network to determine whether conditions exist that are indicative of (e.g., "forecast" or likely to lead to) future performance problems. Accordingly, based on such evaluation, the network management system of a most preferred embodiment may then predict whether a future performance problem is likely to be encountered within the network.

In a most preferred embodiment, once a future performance problem has been predicted, the network management system determines an appropriate preventive action for preventing the performance problem from occurring. Thereafter, the network management system of a most preferred embodiment initiates the appropriate preventive action before the occurrence of the predicted performance problem in an attempt to prevent such performance problem. For example, the network management system may send commands to one or more network elements (e.g., via the distributed gateways) in an attempt to prevent a predicted performance problem. As another example, the network management system may open a problem ticket and/or request service of particular network elements in an attempt to prevent and/or timely respond to predicted performance problems.

Most preferably, the network management system is implemented to "learn" over time. For example, the network management system of a most preferred embodiment is implemented to learn the status conditions that are indicative of future performance problems. For instance, upon a performance problem occurring, the network management system may evaluate the conditions leading up to such a problem in order to enable the system to recognize those conditions as being indicative of a potential problem in the future. As a further example, the network management system of a most preferred embodiment is implemented to learn the appropriate preventive action to initiate in response to a particular performance problem being predicted. For instance, neural networking techniques now known or later-developed for "learning" patterns that indicate a potential problem and/or responsive actions for preventing such a potential problem may be utilized within the network management system. Thus, the network management system may improve its ability to predict performance problems and determine preventive actions for preventing such performance problems over time. Therefore, as the network management system becomes more familiar with the performance of the network, the network management system may more effectively predict performance problems and prevent such performance problems from occurring within the network.

While this invention relates to any network management system, a preferred embodiment will be described in reference to OSI's NetExpert™ system in order to provide a concrete example of a network management system application. Thus, it should be understood that the present invention is not intended to be limited only to OSI's NetExpert™ system provided herein, but rather the NetExpert™ system is intended solely as an example that renders the disclosure enabling for many other types of network management systems. Thus, for example, it will be recognized that the present invention is intended to encompass any type of management system, particularly a centralized management system having distributed gateways for polling network elements and providing status information to the centralized management system for monitoring/evaluating the performance of the network.

It should be appreciated that a technical advantage of one aspect of the present invention is that it provides a pro-active approach to detecting (or predicting) potential system resource problems and resolving (or preventing) such potential problems before they occur. By ensuring that the system is maintained properly, service level assurances are created which greatly enhance the reliability of the overall system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 9 shows a table, which includes the MS class of a preferred embodiment;

FIG. 10 shows a table, which includes the MS Managed Object Manager of a preferred embodiment;

FIG. 11 shows a table, which includes an exemplary managed object named SYSR;

FIG. 12 shows a table, which includes another exemplary managed object named SYSD; and FIG. 13 shows a table, which includes still another exemplary managed object named NETR.

DETAILED DESCRIPTION

A system and method for predicting poor performance (e.g., slowed performance or failure) of a network or a specific network element is provided in accordance with the present invention. A preferred embodiment further provides a system and method which, in response to a predicted performance problem, take preventative action in an attempt to prevent such a performance problem from occurring. While this invention relates to any management system (e.g., any EMS/NMS/OSS), a preferred embodiment will be described in reference to OSI's NetExpert™ system in order to provide a concrete example of a management system application. Thus, it should be understood that the present invention is not intended to be limited only to OSI's NetExpert™ system provided herein, but rather the NetExpert™ system is intended solely as an example that renders the disclosure enabling for many other types of management systems. The term network "management system" (MS) may be utilized herein for conciseness, and is intended to broadly encompass EMSs, NMSs, OSSs, as well as other types of network management systems, such as service management systems (SMSs) and business management systems (BMSs). A preferred embodiment may be best described in conjunction with an exemplary service management system, which will be presented herein within the context of a telecommunication management network (TMN) architecture. Accordingly, FIGS. 1–6 illustrate a typical TMN architecture showing functional components and entities.

A. Overview

Figure 1:
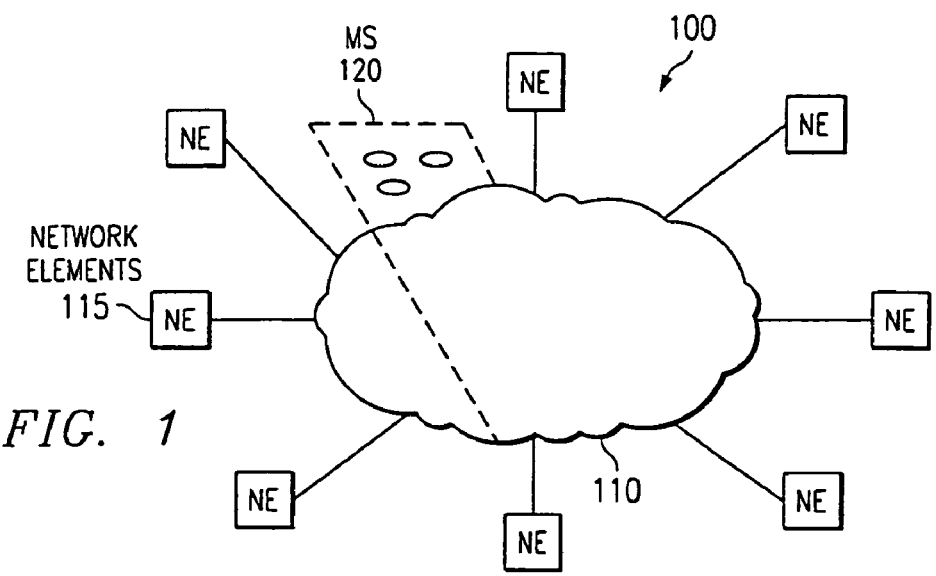
FIG. 1 is a functional depiction of the conceptual Telecommunication Management Network (TMN) relationship between Management System (MS) and the managed network.

FIG. 1 conceptually depicts the TMN-like system 100 relationship between the management system ("MS") 120 and the managed network system 110, which includes network elements (NEs) 115 that make up the physical network and the business components and services (not shown) that are implemented with the network. Accordingly, the management system 120 includes element, network, service (and in some cases business) management systems, EMS, NMS, SMS, and BMS, respectively. FIG. 1 illustrates the overseeing nature of MS 120. Network elements 115 correspond to the physical modules and systems (e.g., switches, termination points, databases, sub-networks) that are managed by MS 120.

Figure 2:
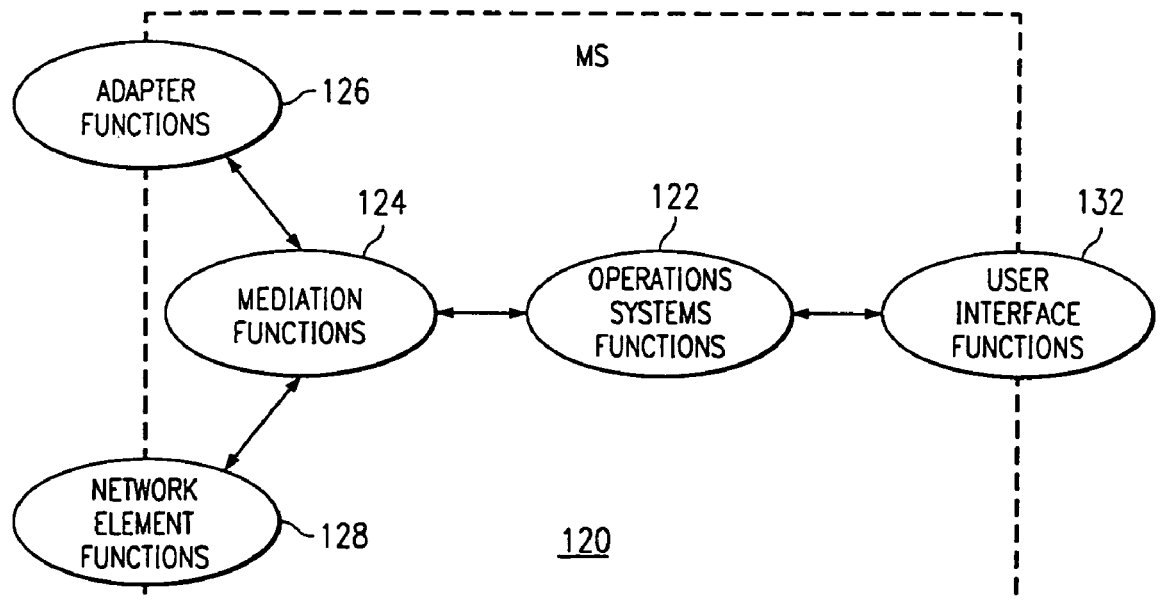
FIG. 2 shows a logical functional diagram of a MS consistent with the TMN standard.

FIG. 2 shows a logical functional diagram of a management system 120 that is substantially consistent with the TMN standard. MS 120 includes operations systems functions 122, mediation functions 124, adaptor functions 126, network element functions 128, and user interface functions 132. Operations systems functions 122 correspond to functions within the management system (e.g., EMS, NMS, SMS, BMS, and/or OSS). Mediation functions 124 communicatively link operations systems functions 122, adaptor functions 126, and network element functions 128 between one another. User interface functions 132 are linked to operations systems functions 122 for providing users with access to the MS 120.

Operations systems functions 122 correspond to functions for implementing the various management systems (e.g., SMS, NMS, EMS). It performs various activities including obtaining management information such as acquiring alarm information from managed network elements, performing the required information processing activities on the network (e.g., correlating alarms, implementing service requests), activation/modification/de-activation of service, and directing the managed elements to take appropriate action such as performing a test. Mediation functions 124 perform functions for mediating communications between the various functional blocks. It includes resources for storing, filtering, and translating data in order for information to be in a suitable form for a receiving functional block. For example, a network element may require information from the MS 120 to be packaged in various protocols such as X.25, Protocol 95, and BX.25. Adaptor functions 126 interface communications between the managed network 110 and third-party systems not necessarily managed by the MS 120. Network element functions 128 correspond to the actual physical elements that make up the network 110. Incidents (or information packets) corresponding to the actual managed network service are provided to the elements by the operations systems functions 122 via the mediation functions 124 in various manners. Some network elements (e.g., a switch) may generate and transmit their own incidents, while others (e.g., a router or circuitpack) may be managed by an element manager, which generates and transmits the incidents for its managed elements. Finally, the user interface functions 132 provide to human users access to the operations systems functions 122. The adaptor, network element, and user interface functions are represented as being partially in and out of the MS 120 because they are part of the system, but they also interface with the physical world.

Figure 3A:
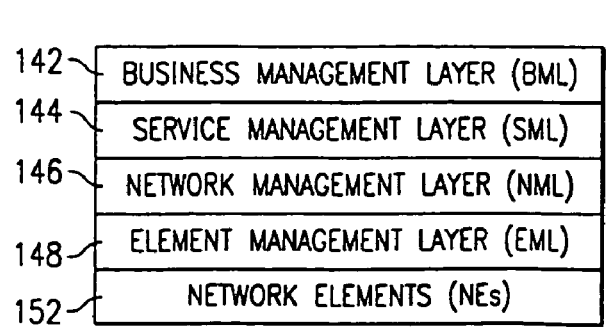
FIG. 3A is a TMN standard abstraction of four layers for managing a network through an MS.

As shown in FIG. 3A with management layer model 140, the TMN standard abstracts four different layers for managing a network. These layers include business management layer 142, service management layer 144, network management layer 146, and element management layer 148. Also fit within this conceptual depiction is a network element layer 152, which corresponds to the managed network elements.

The element layer 148 is the lowest layer in the model; it corresponds to management of the model objects fundamental aspects of the network including its physical components and systems. The next layer upward is the network layer 146. It generally corresponds to management of the network's higher-level components and interconnections. The next upward layer is the service layer 144. This layer typically corresponds to management of the services (e.g., number and type of ports, quality) provided to subscribers or clients of the network. (The term "client" is used broadly and covers any type of network client including clients within an Intranet or subscribers to a network service provider such as a WAN, telephone, wireless, cable, or Internet service provider.) Finally, the business layer 142 corresponds to management of business aspects of the network service provider.

Two principle aspects of this architecture are the Service Management Layer (SML) on the one hand and the Network and/or Element Management Layers (NML/EML) on the other hand for monitoring and controlling the provision of services by means of a network. The SML provides coordination of all activities associated with the management of services provided on the relevant network. The NML/EML provides processes by means of which the network itself can be planned and operated.

Clearly, activities relating to a particular layer in a management system have an impact in other layers. For instance, a switch failure is directly relevant to the network and/or element layers but could also have an impact on the services running on that switch, and therefore on the SML. It is thus very important in the management system that there can be close interaction between layers (or domains) of a management system of this type. Most preferred embodiments of the present invention are designed such that close and effective interaction is enabled between layers, or domains, of a service and network/element management systems.

Figure 3B:
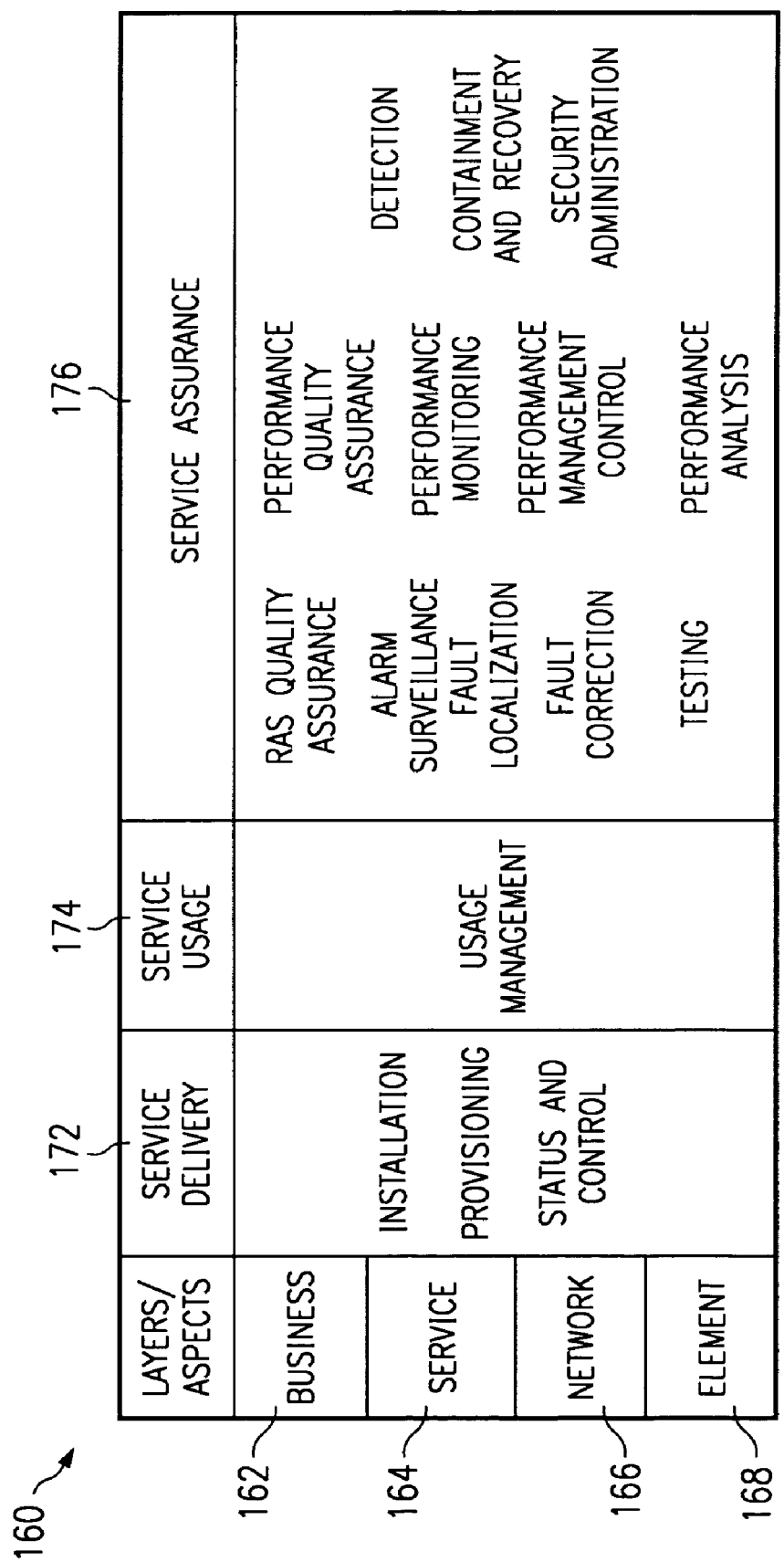
FIG. 3B shows a table, which includes the management layers of FIG. 3A and associated functional groups of service delivery, service usage, and service assurance.

The TMN architecture also articulates general functional groups that are to be managed across the various network management layers. These functional groups include fault, configuration, accounting, performance, and security. FIG. 3B shows table 160, which includes management layer rows (business layer 162, service layer 164, network layer 166, and element layer 168) and functional group columns (service delivery 172, service usage 174, and service assurance accounting 176). The depicted functional categories, which are shown as applying to each layer, are derived from the TMN architecture (M.3200).

B. Management System

The following description of embodiments of the present invention is expressed in terms of object-oriented principles. These are known and relate to programming techniques in which entities in the real world are described in terms of software objects. Each software object comprises data relevant to the real world entity, which data can only be accessed by means of relevant process software. That is, the data is encapsulated in process software, presenting an integrated unit of data and behavior. Objects can be grouped into classes, the objects in each class sharing the same attributes. Classes are arranged hierarchically. Subclasses inherit all the attributes of a parent class but also share a common set of additional attributes. It may be that the only attributes necessary are those enabling a real world entity to be managed. For example, as will be addressed below, such objects are used to model the network and the various aspects of providing network services in a most preferred embodiment. These objects are model objects and have associated network model object classes. The classes may identify network capabilities, such as capacity, or may identify services or service-supporting features. The principle of management systems, according to embodiments of the present invention, is that the data structure effectively decouples services from the networks on which they are provided. This can be particularly important, for instance, where one or more service providers are to provide services across one or more independent network operators' networks.

Figure 4:
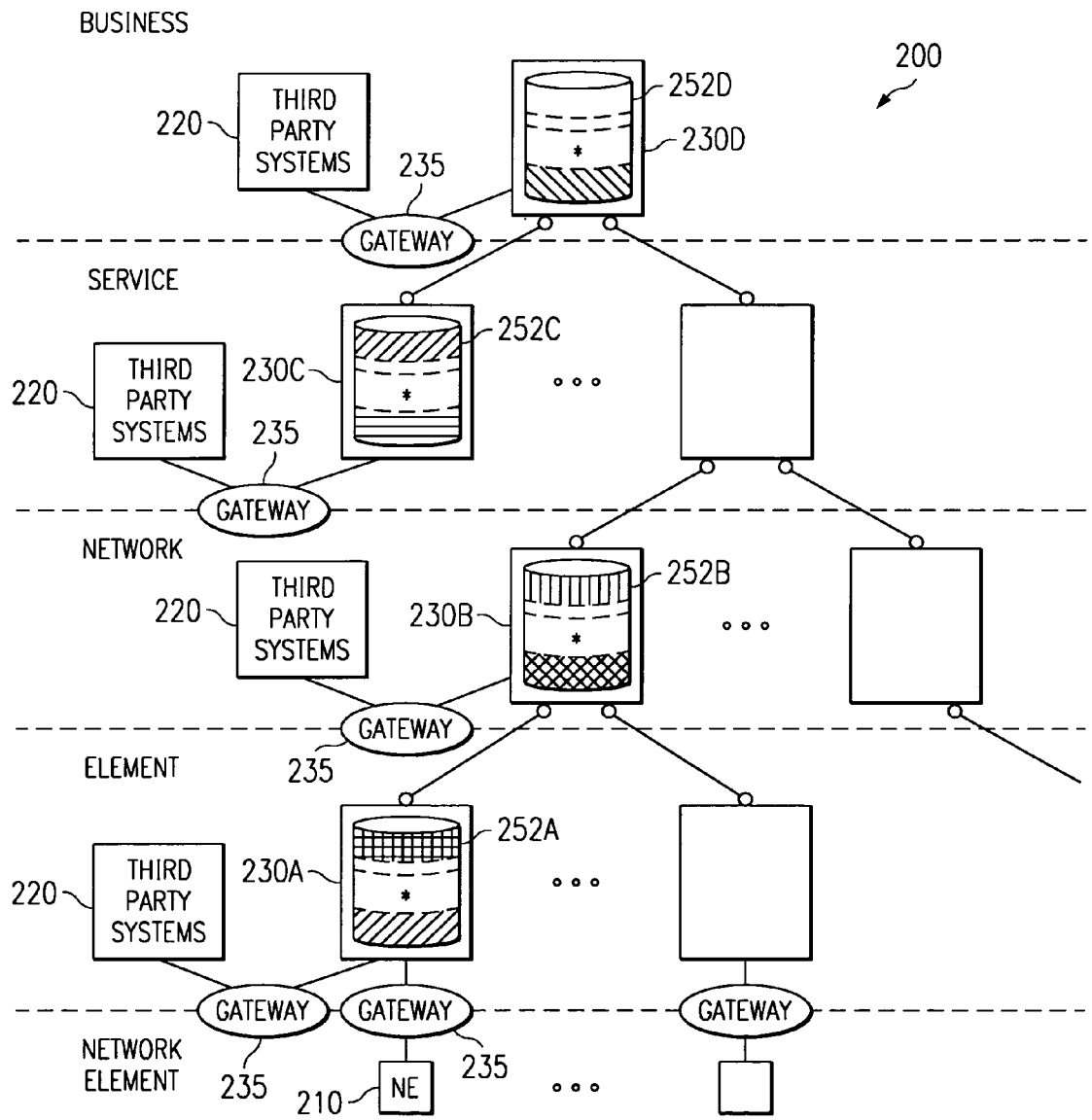
FIG. 4 depicts one embodiment of an MS for managing and providing network services.

FIG. 4 shows one embodiment of a Management System (MS) 200 for managing one or more of the FCAPS (fault, configuration, accounting, performance, and security) functions including the service management functions of FIG. 3B across the various management layers. Management System 200 includes gateways 235 and management processor system 230, which includes management processors 230A, 230B, 230C, and 230D (for the element, network, service, and business layers, respectively). As shown in FIG. 4, service management processor 230C is communicatively interconnected between the network and business management processors 230B and 230D, respectively. Likewise, network management processor 230B is interconnected between the element management processor 230A and the service management processor 230C. The element management processor 230A is linked through a gateway 235 to the managed network elements 210 for sending commands to and receiving messages from the managed network elements. The element management processor 230A serves as the interface for the management processor system 230. Management processor system 230 is also connected to third party systems 220 through gateways 235.

Managed network elements (or network elements) 210 comprise the various elements of the managed network. Managed network elements correspond to the network elements functions 152, 128 and network elements 115 from FIGS. 3, 2 and 1, respectively. Managed elements can receive and provide (either directly or via an element manager) commands and messages (or incidents) for controlling and monitoring the element. For example, a managed element may provide an incident message that includes pertinent information about the particular element. For instance, an incident for a switch could be an alarm incident that identifies the switch and indicates that some portion thereof has failed. With numerous vendors supplying elements for a given network, messages/commands can vary in form (e.g., different protocols such as X.25, HTP/IP, Ethernet, Serial Asynchronous (RS-232), TCP/IP, SNMP, CMIP) from one element to another.

Gateway 235 for network elements 210 may include, among other things, a rule engine for identifying, parsing, and normalizing received element responses (or messages, incidents) and for composing outgoing commands. For example, with outgoing commands, a command may be composed in a generic format and mapped into vendor specific parameters for a particular network element by Gateways 235. Normalizing involves mapping (or translating) a received incident into a suitable, consistent form (e.g., ASCII), which may be discernable within the entire management system 200. Identifying and parsing involves identifying the incident's source and associated management level (or an outgoing request's destination and associated management level) so that it may be processed in the correct management processor (i.e., element 230A, network 230B, service 230C, or business 230D).

Some model objects of the messages/commands received from and/or sent to the network elements 210 may be element layer service requests because these communications (e.g., incidents) correspond to signals from/to the physical network "elements." However, incidents are not exclusively generated within the physical network itself. Management processors may also generate incidents for higher level layers and pass them upward to the corresponding management processor. For example, a given customer may have contracted for premium accessibility. This would correspond to a service layer function or issue. A number of physical network or element layer elements responsible for providing this service may be impaired. However, the elements themselves are not capable (or even in a position) to communicate this "service" problem to the system. Thus, the element and/or network management processors may determine, from an aggregate of element and/or network alarm incidents, that this customer's premium service is impaired. An appropriate service alarm would then be generated and provided to the service management processor 230C by the element and/or network management processors 230A, 230B, respectively. Additionally, management processors may further respond to messages/commands (e.g., service requests) from higher level layers and communicate with other management processors for performing a desired task. For example, the service management processor 230C could receive and process a service request and pass appropriate commands to the lower-level network/element management processors, which would determine how to implement the processed, requested service on the physical network elements.

The management processor system 230, which includes management processors 230A, 230B, 230C, and 230D, performs basic, as well as advanced, processing tasks, for managing or implementing a given function (e.g., fault, configuration, accounting, performance, security) across the various management layers. The management processor system 230 may be implemented on one or more connected servers. The individual processors 230A, 230B, 230C, 230D (which will be discussed below) may be physically (as well as conceptually) distinct from one another, but this is not necessary.

Figure 5A:
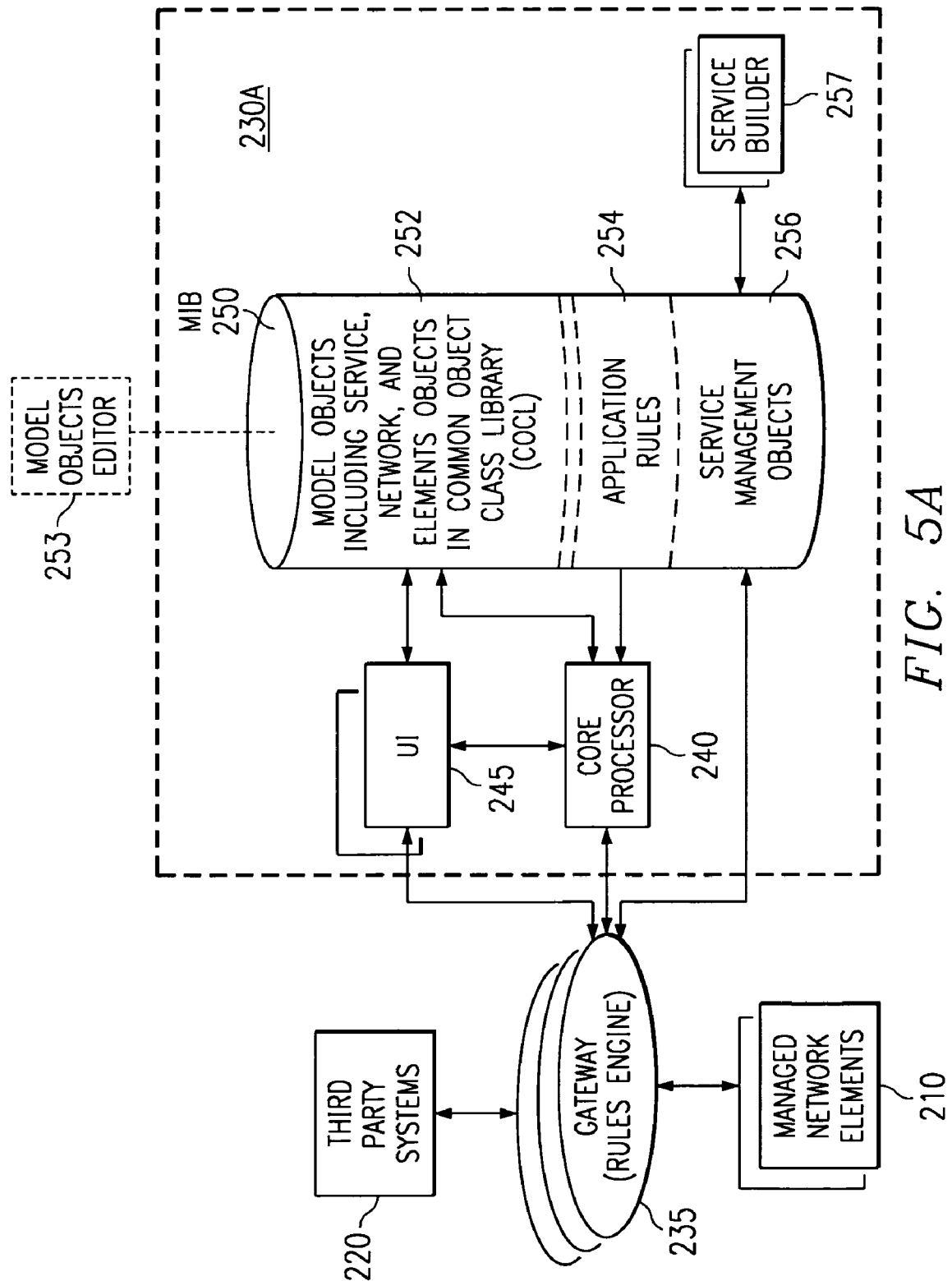
FIG. 5A shows one embodiment of a management processor for implementing a MS.
Figure 5B:
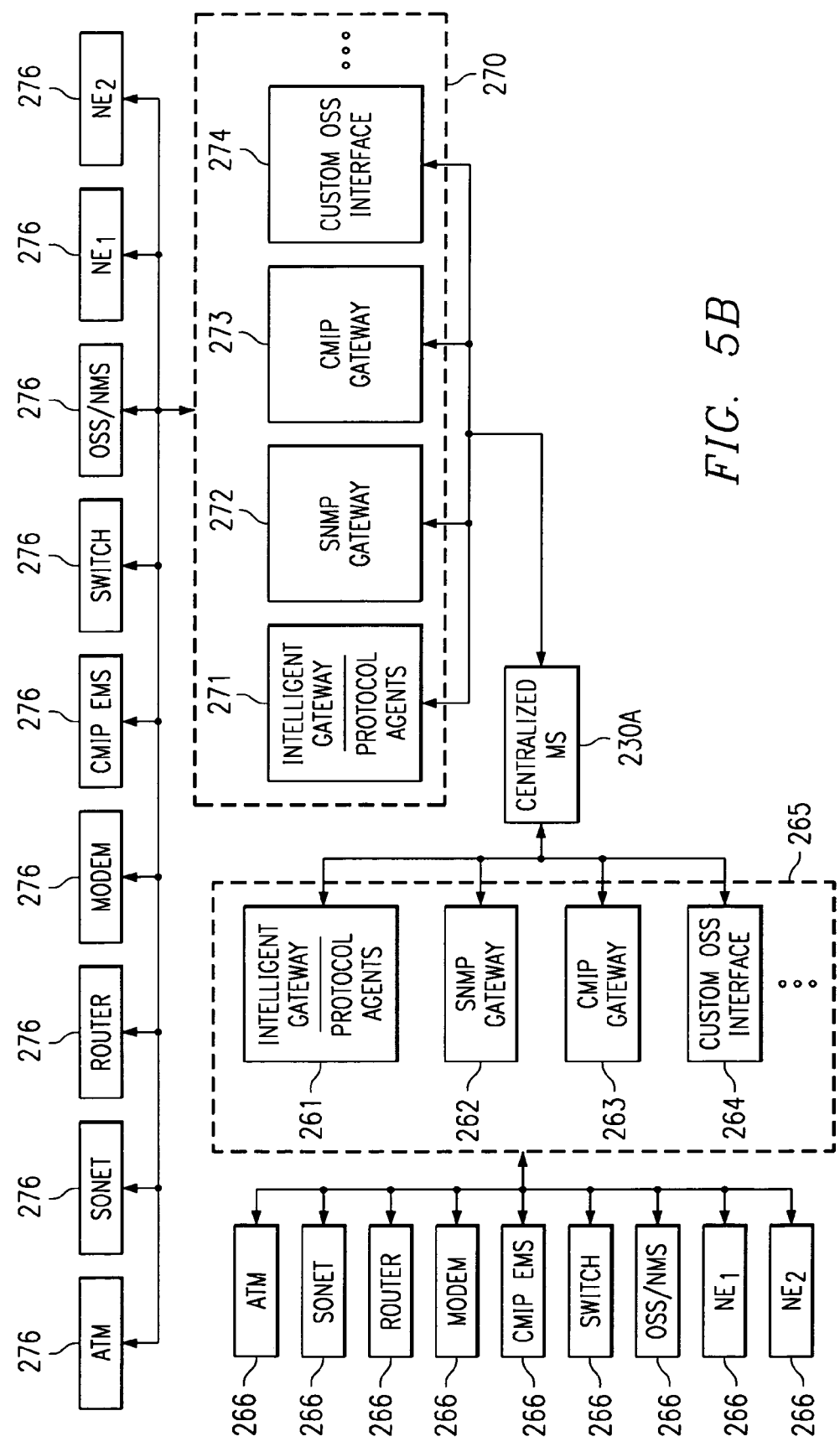
FIG. 5B shows an embodiment of a management processor implemented with a plurality of distributed gateways for monitoring-network elements.

FIG. 5A further shows element management processor 230A of a most preferred embodiment. The other management processors (230B, 230C, and 230D) essentially function the same as the element management processor 230A except that they communicate with adjacent management processors and not necessarily directly with the network interfacing gateway 235. Thus, the element management processor 230A will be discussed with the same general principles applying as well to the other management processors.

Management processor 230A preferably includes core processor 240, user interface 245, and management information base (MIB) 250. The core processor 240 is connected to gateway 235, MIB 250, user interface 245, and to the upwardly adjacent network management processor 230B (not shown). The user interface is also connected to the MIB 250. Note that with the other management processors 230B, 230C, 230D in the depicted embodiment, the core processor 240 would be connected to upper and lower adjacent management processors and not to the incident-receiving gateway 235. MIB 250 further includes a model objects section 252, application rules section 254, and service management objects section 256. MIB 250 also has model objects editor 253 for editing the model objects section 252 and a service builder editor 257 for editing the service management objects section 256. User interface 245 may actually comprise multiple user interfaces located at different sites. For example, with multiple gateways 235, a separate user interface 245 could be provided for each gateway 235, as well as for the management processor.

Core processor 240 preferably includes a processing (or rule) engine for performing tasks including advanced processing of service management objects that are initiated and derived from the executing service order components as determined in the gateway 235. This processing is responsive to the service's parameters, as well as to the particular attributes associated with the derived and initiated service management objects. Object processing in gateway 235 and core processor 240 preferably carries out the predefined policies (or objectives) for activating services on the network responsive to the particular incoming generic component activation requests.

It should be noted that gateway 235 may actually comprise numerous gateways distributed about the network. Thus, by having the basic processing occur in the gateway(s) 235, the overall processing (which includes basic and advanced processing) can be efficiently distributed both systematically and geographically rather than exclusively occurring at a centralized core processor 240. For example, turning briefly to FIG. 5B, an example of distributed gateways that may be utilized in a preferred embodiment is shown. As shown, management processor 230A may be implemented within a centralized MS that is communicatively coupled to distributed gateways or groups of distributed gateways. For example, group 265 may be implemented at one location of a network and group 270 may be implemented at another location of such network. Group 265 may include various gateways for monitoring (e.g., polling) particular types of network elements (e.g., each may monitor network elements having particular communication protocols, including as examples intelligent gateway 261, SNMP gateway 262, CMIP gateway 263, and custom OSS interface gateway 264, which may monitor various network elements 266, such as ATMs, Sonets, routers, modems, CMIP EMSs, switches, OSSs/NMSs, as well as various other network elements local to group 265. Likewise, group 270 may include various gateways for monitoring (e.g., polling) particular types of network elements (e.g., each may monitor network elements having particular communication protocols, including as examples intelligent gateway 271, SNMP gateway 272, CMIP gateway 273, and custom OSS interface gateway 274, which may monitor various network elements 276, such as ATMs, Sonets, routers, modems, CMIP EMSs, switches, OSSs/NMSs, as well as various other network elements local to group 270. Thus, in a preferred embodiment, data collected by the distributed gateways may be communicated to the centralized MS.

Continuing with the description of FIG. 5A, user interface 245 (which may be implemented within the centralized MS of FIG. 5B) may be any suitable device (or devices) such as a display terminal for providing users with interactive access to the management system 200 through gateway(s) 235 and/or management processors 230A, 230B, 230C, 230D. As discussed above, the user interface may actually comprise a plurality of user interfaces depending upon the particular requirements of the managed network.

MIB 250 is preferably an information base for storing objects and rules for managing and modeling the network. In one embodiment, MIB 250 comprises model objects section 252, application rules section 254, and service management objects section 256. The MIB preferably stores the network managed objects, which are objects that correspond to the managed components (physical network elements, contracts, services) for providing network services to customers or clients. The model objects can exist in any management layer. In the depicted embodiment, a separate MIB is shown for each management layer; however, a common MIB, as well as a common management processor for that matter, could be used for the entire management processor system 230. The model objects preferably contain attributes that reflect the state of the actual element or component that is being modeled. Thus, the entirety of model objects within this section (for each of the management layers) preferably model the network and provided network services, which allows the management system to track and model the state of the managed network. It should be recognized, however, some embodiments of the present invention may not use or require complete or even partial network models.

The application (management) rules 254 may hold data in relation to network constraints, such as capacity, or may hold data in relation to service constraints, such as conditions set out in service level agreements between a customer and a service provider and/or network operator. It is this, at least in part, which gives embodiments of the present invention the capability of managing across inherent interfaces of a management system, such as between the service management and network management domains, to support a set of operational-related conditions such as those of a Service Level Agreement or the like. Service Level Agreements (SLAs) are usually between a network or service provider and a user or customer, and set out the service or services the user or customer has selected, together with the conditions the service provider has agreed to meet.

The network (or managed) objects editor 253 enables editing of the model objects within the model objects section 252. Depending upon the particular embodiment, it could include a work-station for manually augmenting or otherwise modifying this set of model objects. For example, a user could add an object for a router that is to be added to the network.

Figure 6:
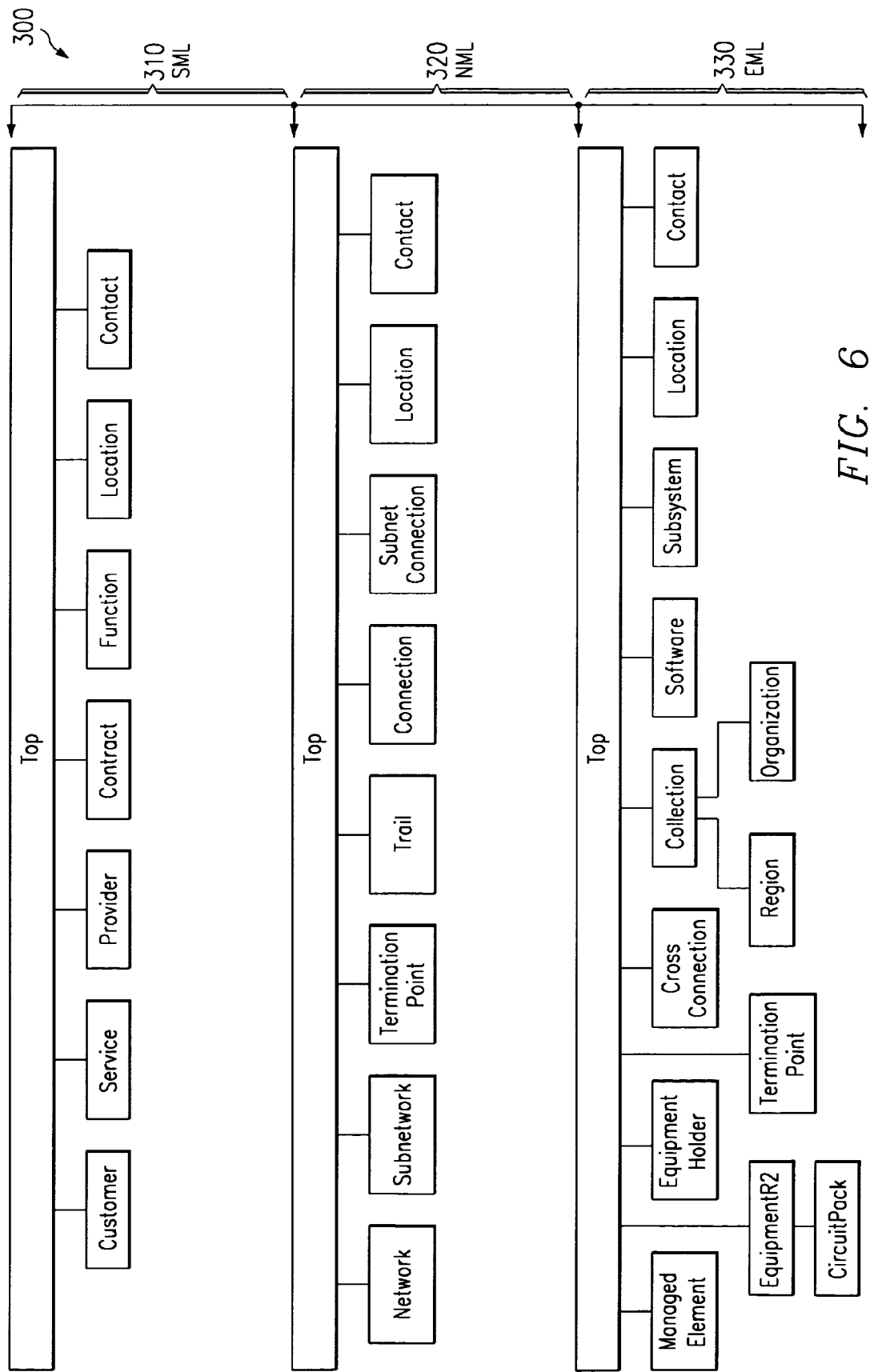
FIG. 6 illustrates one embodiment of a class tree for Object Classes (OCs) within the element, network, and service layers.

Returning to the managed (model) objects, FIG. 6 shows one embodiment of a class tree 300 for object classes within the element, network, and service layers. Class tree 300 includes service layer object classes 310, network layer object classes 320, and element layer object classes 330. (For more information regarding these classes and the concept of a Common Object Class Library (COCL), refer to the co-pending and commonly assigned U.S. patent application Ser. No. 09/469,026 entitled "SYSTEM AND METHOD FOR A COMMON OBJECT CLASS LIBRARY," which is hereby incorporated by reference herein.) The model objects model and track the state of the network, which is useful in various MS applications. With the service management system of a most preferred embodiment, these model objects are updated to reflect the new state of the network. In addition, the model objects maintain records for the managed elements and provide an interface model for conveying information through the user interface 245 to a user.

In a preferred embodiment, the application rules comprise reusable (generally applicable) application logic that interacts with the objects from the service management objects on the one hand, and with the network model (formed by the model objects) on the other. Each unique, processed service component (as depicted in FIG. 4) may have different service management objects, as well as model objects, but will share this applications rule processing logic. These application rules may be common for the management processors in each of the management layers.

Figure 7:
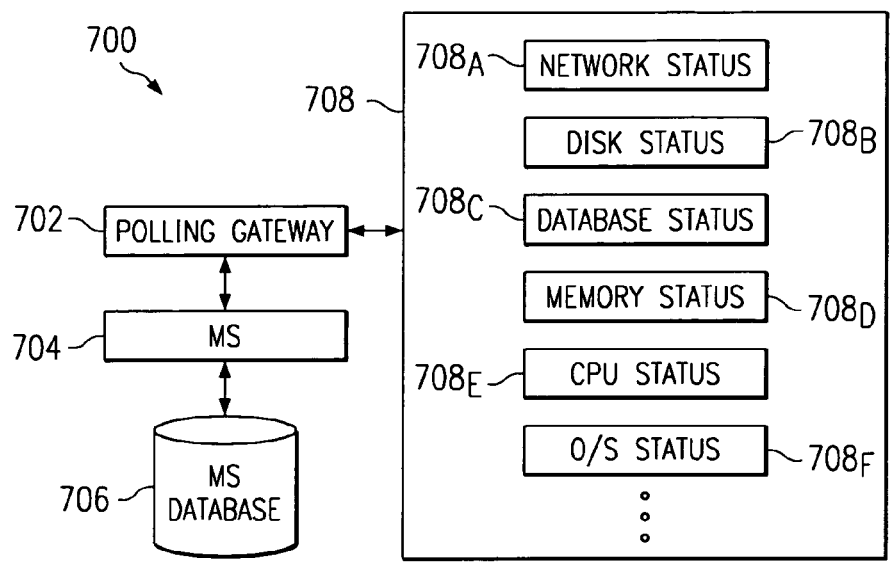
FIG. 7 shows an exemplary implementation of a preferred embodiment of the present invention.

With this general network management system in mind, a preferred embodiment of the present invention will now be discussed. Turning to FIG. 7, an exemplary implementation of a preferred embodiment is shown. Shown in FIG. 7 is system 700, which includes a MS 704, most preferably NetExpert™. More specifically, the MS 704 resides on a computer platform and oversees the network (e.g., network 708), as discussed in FIGS. 1–6 above. Preferably, a MS Database 706, such as NetExpert™ Database, is also included, and is implemented such that MS 704 is capable of communicating therewith (i.e., MS 704 is capable of accessing MS Database 706). System 700 further includes a polling gateway 702 which, over an interval, will request status information for the network 708. For example, network 708 may include various elements (or "resources"), such as disk(s), database(s), memory, CPU(s), and operating system(s) (O/S). Accordingly, polling gateway 702 of a preferred embodiment may poll the various elements of network 708 to retrieve status information, such as for example the network's status $708_A$, disk status $708_B$, database status $708_C$, memory status $708_D$, CPU status $708_E$, and O/S status $708_F$ from the host machine(s) that is being monitored. Of course, as described above, MS 704 may be a centralized server having a plurality of distributed polling gateways 702 distributed throughout a network, and such polling gateways may be utilized to monitor (e.g., "poll") various types of devices (or network elements). Thus, for example, CPU status $708_E$ of several various types of devices within network 708 may be monitored. Of course, gateway(s) 702 of a preferred embodiment may be implemented to gather various other types of status information, including without limitation CPU Run queue, CPU Run queue blocks, CPU Run queue waits, context switching, memory paging, swap allocation, disk writes, disk blocking, disk waiting, disk utilization, network inbound packets, network outbound packets, network errors, and network collisions. Thus, status information for various characteristics of network elements may be gathered by gateway(s) 702 of a preferred embodiment.

Once polling gateway(s) 702 retrieves the status information, such information may be communicated to MS 704, and MS 704 may store such status information in MS database 706. Based on known rules of system performance, which may be defined by a network administrator for example, the MS 704 of a preferred embodiment will then intelligently predict whether a performance problem is likely to be encountered in the future. More specifically, a most preferred embodiment monitors the network elements (or "resources") and determines a particular pattern (e.g., a pattern of performance that may be represented mathematically). Based on the determined performance pattern of one or more elements, statistical analysis can be performed to predict a likely performance problem (e.g., failure) of such element(s) or the network as a whole. For example, statistical analysis may be performed based on the determined performance pattern for an element to determine that given conditions X, Y, and Z, a performance problem will likely be encountered for the element or network. As another example, various network elements may be correlated such that if condition X is detected in a first network element and condition Y is detected in a second network element, then it may be determined that a performance problem will likely be encountered for those network elements, other network elements, and/or the network as a whole. That is, because status information for various devices throughout the network may be obtained by various distributed gateways 702 and forwarded to a central MS 704, such MS 704 may correlate the status information for various network elements to predict performance problems within the network. Thus, the performance of the elements (or resources) within a network may be modeled mathematically (e.g., in software), such that MS 704 can predict the likely occurrence of a performance problem in the network.

It should be understood that in a most preferred embodiment, user-defined rules may be implemented within the central MS (which may be communicated to the distributed gateways), wherein such rules define the types of status information to be obtained by polling gateway(s) 702 and/or the conditions to be monitored by the central MS for such status information (as well as responsive actions to take upon a rule being true). For example, the rules may specify to poll CPU status, disk status, and memory status information for particular devices within the network, and to poll other types of status information for other devices within the network. Furthermore, the rules may define particular conditions to monitor the received status information for and/or particular responsive actions to take upon detecting a particular condition within the monitored status information. For example, a rule may be implemented to detect when the CPU utilization of one or more devices is above a first threshold amount. Another rule may be implemented to further detect when the CPU utilization of one or more devices is above yet a higher, second threshold amount. The rules may define particular responsive actions to take in response to the detection of such conditions, such as alerting a network administrator, attempting to reallocate tasks to other resources, opening a problem ticket, etcetera. Generally, a "rule" includes logical operations that typically evaluate an expression to either true or false, although other types of logical operations that may evaluate to something other than true or false may be implemented as a rule. The resultant evaluation of the expression can determine the appropriate action to be performed. Examples of logical operators that may be utilized within a rule include "if . . . then . . . else" operations, as well as various other well known Boolean operations (e.g., ANDs, ORs, etcetera). Accordingly, a preferred embodiment, enables a network administrator to implement rules within a centralized management system that define how to monitor various elements of the network (e.g., how to correlate the various elements). That is, such rules may define a prediction of a particular performance problem. Thus, through evaluating past performance trends of the network, a network administrator may identify patterns that indicate future performance problems are likely to occur (e.g., patterns that can be used to predict the likely occurrence of particular performance problems), and rules may be implemented within the MS to monitor the system for the occurrence of such predictive patterns.

A preferred embodiment enables a network administrator to take full advantage of this pattern information in managing the network by enabling the network administrator to implement rules to detect patterns that the administrator has identified as being indicative of future performance problems. Furthermore, a preferred embodiment further enables a network administrator to define, within the rules, appropriate responsive actions to be initiated by the MS upon a particular condition (or pattern) existing, in an attempt to prevent and/or timely respond to a predicted performance problem. Thus, as a network administrator (or others) become aware of patterns that foreshadow performance problems, rules may be implemented to detect those problems and automatically take the appropriate responsive action (e.g., alerting the network administrator that the pattern has been detected and/or initiate a command in an attempt to prevent the predicted performance problem). While the task of evaluating collected data to determine whether a particular pattern exists foreshadowing a performance problem would be difficult (if not impossible) to be consistently performed by an operator, offloading this monitoring task to the MS through rules enables greater consistency in detected any of various patterns that are known to foreshadow a performance problem, thus enhancing the overall reliability of the network.

By collecting status information (e.g., within MS database 706), a preferred embodiment enables a network administrator to review the status of the network leading up to a particular performance problem that has been encountered, and from such information, the network administrator may detect correlations and patterns for such status information that appear to be indicative (or predictive) of such a performance problem. For instance, the network administrator (or others) may learn that typically when performance problem X occurs, particular pattern(s) of status information have foreshadowed such problem. In response, the network administrator may, in a preferred embodiment, define rules that correlate various elements and define the predictive patterns of status information for use in managing the network. A most preferred embodiment includes a user-friendly, graphical user interface with which users (e.g., network administrators) may interact to develop such rules for monitoring the network. Also, various rules that are commonly known to foreshadow particular performance problems may be pre-packaged into the MS, and the network administrator may be provided the option of utilizing any one or more of such rules that the administrator so desires. Additionally, in a most preferred embodiment, neural networking techniques now known or later developed may be utilized within the MS to enable the MS to identify such correlations and predictive patterns that are indicative that a performance problem is likely to be encountered in the future. Thus, in one embodiment, neural networking techniques may be utilized within the MS to enable the MS to "learn" correlations and/or patterns that are indicative (or foreshadow) a particular performance problem. Examples of the types of performance problems that may be predicted through such correlation and/or patterning utilizing, for example, statistical analysis of collected status information include, without limitation, CPU resource utilization (e.g., over-utilization), memory utilization (e.g., over-utilization or diminished capacity), disk I/O problems (e.g., disk capacity problems), network bandwidth utilization (e.g., over-utilization or diminished bandwidth capacity), system halts due to running out of disk space, system freezes due to CPU load, system freezes due to lack of memory, and system slowdown due to lack of available swap space.

It should be recognized that one particularly advantageous feature of a most preferred embodiment is that disparate network elements (e.g., elements which may be from various different vendors, may have various different standards and protocols, and may be distributed or separated geographically) can have their status information correlated to identify patterns of such status information that are predictive of performance problems, which could not otherwise be identified by merely monitoring individual network elements.

Figure 8:
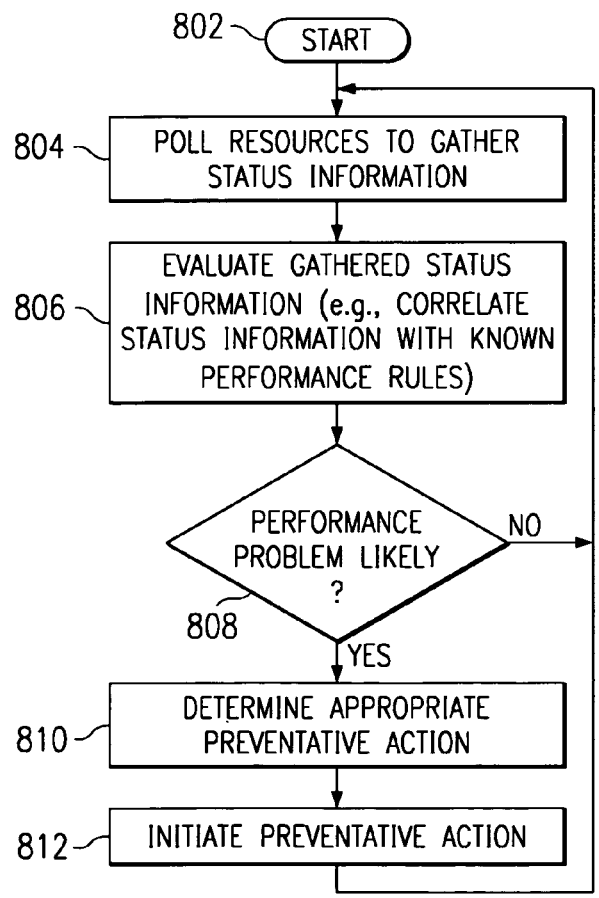
FIG. 8 shows an exemplary flow diagram illustrating the operational flow of a most preferred embodiment.

Turning to FIG. 8, an exemplary flow diagram of the operation of a most preferred embodiment is shown. As shown, operation starts at block 802, and at some time interval thereafter the polling gateway(s) (e.g., polling gateway(s) 702 of FIG. 7) polls the resources of the network elements to gather status information at block 804. For example, the polling gateway may gather status information, such as network status, disk status, database status, memory status, CPU status, and O/S status for various network elements. Such status information is communicated from the gateway(s) to the MS (e.g., MS 704 of FIG. 7). At block 806, the MS (e.g., MS 704 of FIG. 7) evaluates the gathered status information. For example, the MS may correlate the gathered status information with known performance rules (e.g., user-defined rules implemented by a network administrator or MS-defined rules "learned" over time) to determine whether a performance problem is likely to be encountered in the future. Accordingly, based on the evaluation of block 806, the MS determines (or predicts) at block 808 whether a performance problem is likely to be encountered. For example, the MS may determine based on the evaluation of the gathered status information whether one or more of the resources of the network is likely to incur a performance problem. If it is determined at block 808 that a performance problem is not likely to be encountered (e.g., the gathered status information does not indicate that a performance problem is likely), then after some time interval elapses operation advances to block 804 to again poll the resources. On the other hand, if it is determined at block 808 that a performance problem is likely to be encountered, then a most preferred embodiment determines an appropriate preventative action responsive to the predicted performance problem, as shown in block 810 of FIG. 8. As described above, such responsive action may be defined in a rule, such as a user-defined rule or a MS-defined rule (e.g., through the MS "learning" the appropriate responsive action over time). More specifically, in a preferred embodiment, the rule which defines the condition/pattern that is predictive of a performance problem, further defines the appropriate responsive action to take upon the rule being true (i.e., upon the defined condition/pattern becoming true within the network). Once an appropriate preventative action is determined, a most preferred embodiment initiates the appropriate preventative action at block 812 in an attempt to prevent the predicted performance problem from occurring.

Turning now to FIGS. 9–13, exemplary model object(s) that may be used in a preferred embodiment to store element information that is gathered by MS 704 in the polling cycle is shown. That is, FIGS. 9–13 illustrate one exemplary method of retaining gathered information within MS 704. Of course, other methods may be implemented in various alternative embodiments, and any such implementation is intended to be within the scope of the present invention. For example, FIG. 9 shows an exemplary class that may be implemented in the MS for various types of resources. FIG. 10 shows an exemplary resource manager object that may be utilized for managing all of the resources of particular network elements. FIG. 10 may be thought of as a parent that manages all of the various resource children, wherein specific information for each particular resource child is included in an object such as that of FIG. 9. Specific examples of resource objects that may be utilized within a Solaris type system are shown in FIGS. 11–13, and various other resource objects for may be implemented in a similar manner to model other types of systems. More specifically, FIG. 11 provides an exemplary object that models the system resources ("SYSR") for a particular machine by maintaining various attributes for the system resources. Similarly, FIG. 12 provides an exemplary object that models the system disk resources ("SYSD") for a particular system by maintaining various attributes for the system disk resources. Also, FIG. 13 provides an exemplary object that models the network resources ("NETR") for a particular system by maintaining various attributes for the network resources. It should be understood that the objects of FIGS. 9–13 are intended solely as examples, which render the disclosure enabling for various other types of objects that may be implemented.

In a preferred embodiment, the gateways (which may be distributed throughout a network) poll network elements for status information. The status information is sent from the gateways to the MS (which may be a centralized MS), and in a preferred embodiment the information is stored within managed objects on the MS. Examples of such managed objects that may be included within the MS are SYSR, SYSD, and NETR shown in FIGS. 11, 12, and 13, respectively. As the polling gateways return information to the MS, such information may be tested (or measured) against predetermined thresholds (as defined by the rules implemented on the MS). In a preferred embodiment, the result of such testing (or measurement) information is stored again in the corresponding managed object. As the system continues to poll, a statistical average may be calculated to determine a mean rate for the given area being monitored. Based on such a statistical average, mean rate, and/or other statistical information calculated, the MS can extrapolate (using such statistical information) to determine the likelihood and/or when a performance problem would occur if the system continues to run at its current rate.

As an example of the operation of a preferred embodiment, suppose that a gateway (or distributed gateways) polls the system and sends the information to the MS. Further suppose that the MS determines that the "system swap" (Swapa attribute of object SYSR of FIG. 11) is at 70 percent of its capacity. A rule may be implemented on the MS that takes the statistical mean average of this value based on the number of times the poll has been performed. Based on the rate of increase of capacity being used, the MS can determine how much resources the system has available. This information may be stored within the attributes of FIG. 11. If the system reaches a capacity surpassing a pre-determined threshold, it may, depending on the rule implemented, attempt to add more swap space to the system by executing, for example, a "swap -a" command. Instructions to perform such a command may, for instance, be communicated from the MS to the appropriate gateway, and such gateway may execute the command on the network element(s). If such command fails (e.g., the polling indicates that the capacity is at a level at which performance problems are likely to occur in the future), the MS may, again depending on the rule implemented, generate an alert message to an operators workstation notifying the operator of the problem to enable the operator to determine the appropriate action to take in response thereto (knowing that the "swap -a" command failed).

More specifically, in the above example, a gateway may poll the system and receive the following information "swap 3567552 2496692 3566704 70% /tmp." In a preferred embodiment, the gateway may parse the information keying on "swap" and retrieve 70% from the obtained data. Alternatively, the MS may receive the data from the gateway and perform such parsing. Assuming such a rule is implemented on the MS, the MS upon receiving the 70% capacity for "swap" from the gateway (or upon parsing such data from the information received from the gateway) the MS may calculate the mean average, which if it is the first time such poll has been executed is 70%. The rule may then determine whether the 70% is greater than the predetermined threshold (or greater than any of various predetermined thresholds). For instance, suppose the implemented rule provides a threshold of 80% capacity for the swap as being predictive of a future performance problem. Assuming the 70% is returned for the first poll executed, the mean average is 70%, and the rule would evaluate "false" because the 70% capacity is not greater than the 80% threshold.

Continuing with the above scenario, suppose now that a second poll is executed and the gateway receives the following information "swap 3567552 3389174 3566704 95% /tmp." The gateway (or MS) keys on the "swap" and parses the information to obtain 95% as its capacity. The exemplary rule executing on the MS calculates the mean average, which is the first capacity received of 70% and the 95% capacity now received divided by two (the number of polling cycles executed) to result in an average of 82.5%. The rule then determines whether the 82.5% is greater than the predetermined threshold of 80%, and evaluates "true" because the 82.5% is greater than such threshold. The rule may then determine the rate of increase between the two polling cycles, which is in this example 12.5% divided by the polling frequency, which may be, for instance, one poll every five minutes. The rule can then determine when the system would run out of resources (e.g., would run out of swap capacity) it were to continue at this rate, and could initiate an appropriate responsive action, such as displaying this information as an alert to an operator (e.g., to a network administrator). Furthermore, the rule may also initiate a command in an attempt to add more swap space, since it has reached the threshold of 80%. If the command fails, or does not resolve the problem, the rule issues a higher priority alert to the operator informing the operator that the attempted action (e.g., the initiated command) did not resolve the problem and informing the operator of the condition (e.g., notifying the operator of the predicted time that the capacity will be exceeded unless some preventative action is taken).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of managing a network comprising the steps of:
   polling resources of the network to gather real-time status information about the network;
   evaluating performance of the network by identifying network-wide patterns in the gathered real-time status information; and
   determining, based on the result of said step of evaluating and from at least one previously defined rule correlating disparate characteristics of the resources of the network, an action for preventing a future network-wide performance problem from occurring;
   wherein said disparate characteristics include those selected from: CPU run queue capacity, CPU run queue blocks, CPU run queue waits, context switching, memory paging, swap allocation, disk writes, disk blocking, disk waiting, disk utilization, network inbound packets, network outbound packets, network errors, and network collisions.

2. The method of claim 1, further comprising the step of:
   initiating the action before the future network-wide performance problem occurring in an attempt to prevent the future network-wide performance problem.

3. The method of claim 1, wherein said step of evaluating performance of the network further includes:
   correlating the real-time status information with at least one previously defined rule.

4. The method of claim 3 wherein the at least one previously-defined rule defines a known pattern for the gathered real-time status information that foreshadows the occurrence of the future network-wide performance problem.

5. The method of claim 1 wherein the future network-wide performance problem is caused by anyone or more of the problems selected from:
   operability problem of the resources of the network, operability problem of the network, failure of the resources of the network, failure of the network, integrity problem of the resources of the network, integrity problem of the network, efficiency problem of the resources of the network, efficiency problem of the network, decreased processing speed of the resources of the network, decreased processing speed of the network, usage capacity problem of the resources of the network, and usage capacity problem of the network.

6. The method of claim 1, wherein the step of polling resources includes gathering the real-time status information for anyone or more of: network status, disk status, database status, memory status, CPU status, and operating system status.

7. The method of claim 1, wherein the step of polling resources includes gathering the real-time status information by a plurality of distributed gateways that are communicatively coupled to a central management system.

8. The method of claim 1 wherein the at least one previously defined rule includes at least one user defined rule.

9. The method of claim 1 wherein the at least one previously defined rule is implemented as software code executing on a management system.

10. The method of claim 1 further comprising:
the at least one previously defined rule correlating disparate network elements.

11. A system for managing a network, said system comprising:
at least one polling gateway that is operable to poll one or more network elements to gather real-time status information for said one or more network elements;
at least one processor-based management server communicatively coupled to the at least one polling gateway to receive the gathered real-time status information from said at least one polling gateway; and
the at least one processor-based management server predicting the occurrence of a network-wide performance problem within the network based on the gathered real-time status information;
wherein said at least one polling gateway includes a plurality of distributed polling gateways that are each operable to poll particular ones of disparate network elements that include network elements that communicate in different network protocols and include network elements selected from: SNMP network elements, CMIP network elements, and network elements using TCP/IP protocol.

12. The system of claim 11 wherein said one or more network elements include a plurality of network elements distributed in the network.

13. The system of claim 11 wherein said one or more network elements include a plurality of disparate network elements.

14. The system of claim 11 wherein at least one rule defines an appropriate action for said at least one processor-based management server to respond to a defined condition being detected.

15. The system of claim 14 wherein said appropriate action is an action for attempting to prevent the network-wide performance problem predicted by detection of said defined condition from occurring.

16. The system of claim 14 wherein upon detection of said defined condition, said at least one processor-based management server initiates said appropriate action before said network-wide performance problem occurring.

17. The system of claim 11, wherein at least one rule defines a known pattern for status information that foreshadows the occurrence of said network-wide performance problem.

18. The system of claim 11 wherein at least one rule defines statistical analysis of said status information that foreshadows the occurrence of said network-wide performance problem.

19. The system of claim 11 wherein at leas tone rule defines a known correlation of status information that foreshadows the occurrence of said network-wide performance problem.

20. The system of claim 11 wherein said network-wide performance problem is caused by anyone or more of the problems selected from:
operability problem of said one or more network elements, operability problem of the network, failure of said one or more network elements, failure of the network, integrity problem of said one or more network elements, integrity problem of the network, efficiency problem of said one or more network elements, efficiency problem of the network, decreased processing speed of said one or more network elements, decreased processing speed of the network, usage capacity problem of said one or more network elements, and usage capacity problem of the network.

21. The system of claim 11 wherein said status information includes one or more from:
network status, disk status, database status, memory status, CPU status, and operating system status.

22. A management system for managing one or more layers of a network, wherein said managing includes predicting network-wide performance problems that are to occur within one or more layers of the network and taking responsive actions in an attempt to prevent or timely respond to the predicted said network-wide performance problems, said management system comprising:
at least one processor-based management server communicatively coupled to at least one polling gateway that is operable to poll at least one network element to gather real-time status information for said at least one network element, the at least one polling gateway including a plurality of distributed polling gateways that are each operable to poll particular ones of disparate said at least one network element, wherein the disparate said at least one network element include at least one network element that communicate in different network protocols, and said at least one network element selected from: SNMP network elements, CMIP network elements, and network elements using TCP/IP protocol;
the at least one processor-based management server including software code executing thereon, wherein said software code learns a condition for predicting said network-wide performance problem within one or more layers of the network from said gathered real-time status information to enable the processor-based management server to predict the occurrence of said network-wide performance problem within the network.

23. The management system of claim 22 wherein said at least one network element include a plurality of said at least one network element distributed in the network.

24. The management system of claim 22 wherein said at least one network element include a plurality of disparate said at least one network element.

25. The management system of claim 22 wherein at least one rule defines an action for said at least one processor-based management server to take in response to said condition being detected.

26. The management system of claim 25 wherein said action is an action for attempting to prevent the network-wide performance problem predicted by the detection of said condition from occurring.

27. The management system of claim 25 wherein upon detection of said condition said at least one processor-based management server initiates said action before said network-wide performance problem occurs.

28. The management system of claim 22, wherein said condition includes a pattern for status information that foreshadows the occurrence of said network-wide performance problem.

29. The management system of claim 22 wherein said condition includes statistical analysis of said status information that foreshadows the occurrence of said network-wide performance problem.

30. The management system of claim 22 wherein said condition includes correlation of status information that foreshadows the occurrence of said network-wide performance problem.

31. The management system of claim 22 wherein said network-wide performance problem is caused by anyone or more of the problems selected from:
operability problem of said at least one network element, operability problem of the network, failure of said at least one network element, failure of the network, integrity problem of said at least one network element, integrity problem of the network, efficiency problem of said at least one network element, efficiency problem of the network, decreased processing speed of said at least one network element, decreased processing speed of the network, usage capacity problem of said at least one network element, and usage capacity problem of the network.

32. The management system of claim 22 wherein said status information includes one or more from:
network status, disk status, database status, memory status, CPU status, and operating system status.

33. The management system of claim 22 wherein said at least one network element is represented as an object within object-oriented software executing on the processor-based server, said object having one or more attributes for which said status information may be gathered.

34. The management system of claim 33 wherein said condition includes correlation of one or more attributes of one or more objects to define the prediction of said network-wide performance problem.

35. The management system of claim 22 wherein said management system includes a business management layer.

36. The management system of claim 35 wherein said network-wide performance problem includes a business performance problem.

37. The management system of claim 36 wherein said at least one network element includes an electronic commerce system for processing commercial transactions with customers via the Internet, and wherein said business performance problem includes a problem resulting in inability of said electronic commerce system processing said commercial transactions.

38. The management system of claim 22 wherein said management system includes a service management layer.

39. The management system of claim 38 wherein said network-wide performance problem includes a service performance problem.

40. The management system of claim 39 wherein said service performance problem includes problem with the quality provided to subscribers or clients of the network.

41. The management system of claim 22 wherein said management system includes a network management layer.

42. The management system of claim 22 wherein said management system includes an element management layer.

43. The management system of claim 42 wherein said network-wide performance problem includes a network element performance problem.

44. The management system of claim 22 wherein said management system includes a plurality of at least the following layers: business management layer, service management layer, network management layer, and element management layer, and wherein a plurality of said layers are correlated within said at least one rule.

45. A management system for managing one or more layers of a network, wherein said managing includes predicting network-wide performance problems that are to occur within one or more layers of the network and taking responsive actions in an attempt to prevent or timely respond to the predicted said network-wide performance problems, said management system comprising:
at least one processor-based management server communicatively coupled to at least one polling gateway that is operable to poll at least one network element to gather real-time status information for said at least one network element;
the at least one processor-based management server including software code executing thereon, wherein said software code learns a condition for predicting said network-wide performance problem within one or more layers of the network from said gathered real-time status information to enable the processor-based management server to predict the occurrence of said network-wide performance problem within the network; and
a plurality of at least the following layers: business management layer, service management layer, network management layer, and element management layer, and wherein said network-wide performance problem is a problem within any of said plurality of layers.

* * * * *